March 12, 1957 H. BAHLSEN 2,784,686
BAKING OVEN
Filed Jan. 27, 1954
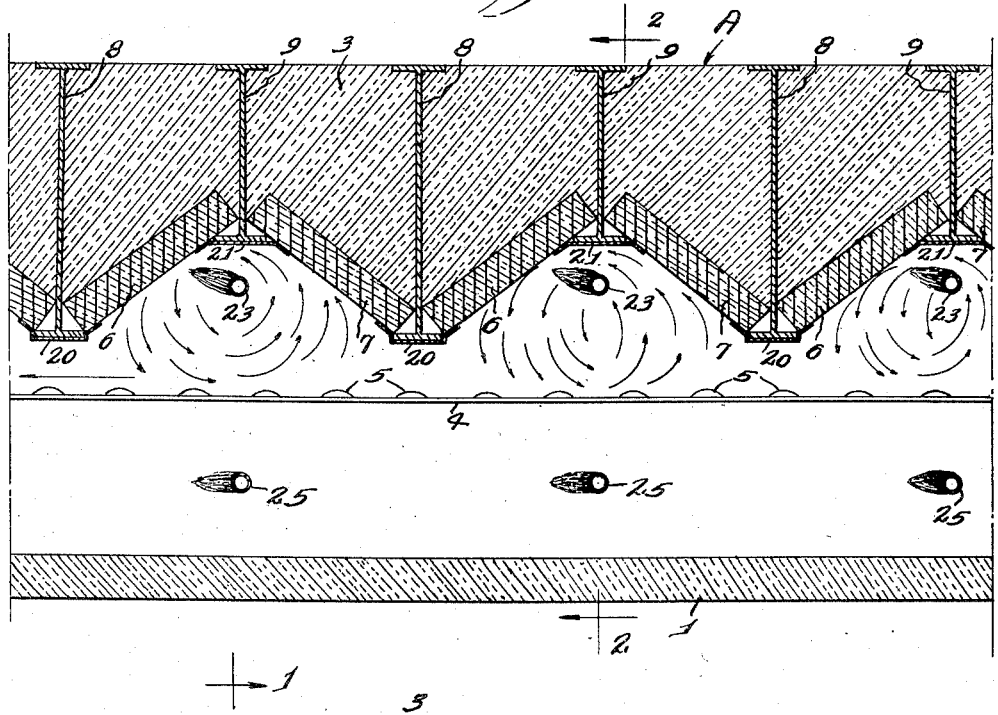
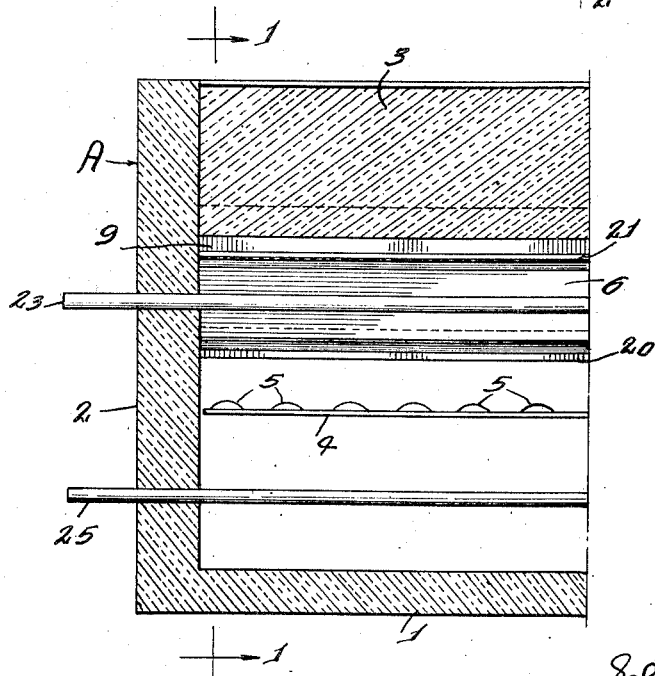
Inventor
Hans Bahlsen

United States Patent Office 2,784,686
Patented Mar. 12, 1957

2,784,686
BAKING OVEN

Hans Bahlsen, Hannover, Germany, assignor to Marba Company, a private company of Canada Application January 27, 1954, Serial No. 406,480

5 Claims. (Cl. 107—57)

This invention relates to a baking oven and more particularly to a baking oven utilizing both radiant and convection heat for baking the goods.

An object of this invention is to provide a new and improved baking oven.

Another object of the invention is to provide a baking oven having a chamber provided with a ceiling which is constructed of brick or stone baffles which, when heated, direct radiant heat toward goods positioned on a conveyor traveling through the chamber.

Another object of the invention is to provide a baking oven as defined in the preceding paragraph wherein the brick baffles are arranged in pairs to form roofs and the baffles in each pair slope downwardly and away from each other whereby heated air currents travel in a generally circular path between the ceiling and the conveyor.

Another object of the invention is to provide a baking oven comprising, a baking chamber formed by an elongated conveyor passage in which the upper run of a conveyor travels from end to end of the chamber for supporting cookies or the like during a baking operation, a plurality of transversely extending gas burners spaced from each other and positioned above the conveyor, a ceiling for the chamber comprising a section above each element having a pair of brick baffles forming roofs sloping downwardly and away from each other and with one of said heating elements centrally below and along the peak of each section, said gas burners having means for directing flames upwardly and laterally towards the baffle nearest the exit at an acute angle thereto so that the heated air currents travel in a generally circular path under the burner toward the conveyor and up again to the other baffle and over the burner, and the heated bricks directing radiant heat toward the conveyor.

The objects of the invention generally set forth, together with other ancillary advantages, are attained by the construction and arrangement shown by way of illustration in the accompanying drawing, in which:

Fig. 1 is a vertical fragmentary section of the baking oven taken along the line 1—1 in Fig. 2; and, Fig. 2 is a vertical fragmentary section taken along the line 2—2 in Fig. 1.

While this invention is susceptible of embodiment in many different forms, there is shown in the drawing and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

The baking oven, indicated generally at A, comprises a base member 1 and side walls 2, one of which is shown in Fig. 2. The base 1 and side walls 2 may be constructed of any suitable insulating material. A cover 3, which may also be made of suitable insulating material, encloses the oven and forms, with the base 1 and side walls 2, an elongated passage through which the upper run 4 of a traveling conveyor may pass. The conveyor 4 may have disposed thereon goods 5 that are to be baked such as cookies, biscuits or the like. The upper run 4 of the traveling conveyor travels from right to left, as viewed in Fig. 1.

The cover 3 has spaced pairs of brick or stone baffles 6 and 7 on its underside which are supported from the cover by relatively tall I-beams 8 and alternate relatively short I-beams 9. The exposed lower ends of the I-beams 8 and 9 are provided with stainless steel covers 20 and 21, respectively, in order to prevent oxidation effects on the steel I-beams.

Each pair of baffles 6 and 7 are formed into an inverted V-shaped roof wherein the baffles in each pair slope downwardly and away from each other. Disposed centrally beneath the peak of each roof, formed by a pair of baffles 6 and 7, is a transversely extending gas burner 23. These burners extend through one of the side walls 2 and across the width of the conveyor and have burner ports which direct the flames emanating from the burner upwardly and laterally toward the adjacent baffle 6 which is nearer the exit of the oven. These flames are directed toward the baffle at an acute angle so that the flames and heated air currents produced thereby will be directed downwardly toward the conveyor 4. The heated air currents, by this arrangement of burner and baffles, will travel in a circular path, as indicated by the arrows, downwardly toward the conveyor under the burner 23, upwardly against the other baffle 7 of said pair of baffles and over the burner. This circulatory motion is aided by the reduced pressure which exists on the side of the burner from which no flames are emitted. The baffles 6 and 7 when heated during use of the oven reach an elevated temperature and because of their downwardly sloping direction also direct radiant heat toward the goods 5 on the conveyor 4.

Positioned underneath the conveyor 4 are additional transversely extending gas burners 25 extending through the side wall 2 which direct their flames in a generally horizontal path toward the exit end of the oven and act to maintain a relatively constant temperature on the underside of the conveyor 4.

I have thus provided a baking oven wherein the goods to be baked are evenly baked and scorching is avoided because of the radiant heat directed from the baffles at an elevated temperature and the reflection of the heat waves, produced by the gas burner, from the brick baffles rather than directly from the burners onto the goods 5. The production of circulatory flow of the convection heat gases causes a more even heating of the cookies 5 and results in a considerable amount of saving in the gas needed for the baking operation.

The baffles 6 and 7 may be formed of ordinary or heat-resistant brick or may be made of stone.

I claim:

1. A baking oven having, in combination, a baking chamber formed by an elongated conveyor passage, a conveyor traveling from end to end of the chamber adjacent the bottom thereof for supporting cookies or the like during a baking operation, a plurality of transversely extending heating elements spaced from each other and positioned above the conveyor so that the heat therefrom is directed principally upwardly, a ceiling for the chamber comprising a section above each heating element and having a pair of brick baffles forming roofs sloping downwardly and away from each other and with a heating element about centrally below and along and spaced from the peak of each section, each heating element being located to radiate heat upwardly and laterally towards the baffle of each pair nearer the exit and at an acute angle thereto so that heat will be radiated from the brick baffles downwardly toward the conveyor and the heated air currents reflected therefrom travel in a generally circular path under the heating element toward the conveyor and up again to the other baffle and over the element.

2. A baking oven for baking cookies or the like by the use of heat applied to the cookies by radiation and convection comprising; a baking chamber formed by an elongated passage, a conveyor having an upper run traveling from end to end of the chamber adjacent the bottom thereof for supporting cookies or the like that are to be baked, a ceiling for the chamber comprising spaced pairs of brick baffles extending across the width of the chamber defining spaced roof units, each pair of brick baffles being arranged in an inverted generally V-shaped roof unit wherein each V-shaped roof unit extends transversely of the conveyor, the baffles in each pair sloping downwardly and away from each other so that the heat radiated from the baffles is directed toward the conveyor, a transversely extending gas burner associated with each pair of baffles and positioned beneath the peak of each pair of baffles and spaced therefrom and above the conveyor to form, with said pair of baffles, a heating unit, means in said gas burner for directing flames upwardly towards the baffle of its respective heating unit nearer the exit and at an acute angle thereto so that the heated air currents thereby created are caused to be reflected from said latter baffle and travel in a generally circular path under the burner toward the conveyor and up again to the other baffle and over the burner, and transversely extending burners beneath the conveyor and positioned generally beneath said first mentioned gas burners.

3. A baking oven having, in combination, a baking chamber formed by an elongated conveyor passage, a conveyor having an upper run traveling from end to end of the chamber adjacent the bottom thereof for supporting cookies or the like during a baking operation, a plurality of transversely extending heating elements spaced from each other and positioned above the conveyor, a ceiling for the chamber comprising a section above each heating element and having a pair of baffles forming roofs sloping downwardly and away from each other and with a heating element about centrally below each section to direct radiated heat toward the conveyor, each heating element having means to radiate heat upwardly and laterally towards the baffle of its respective roof nearer the exit and at an acute angle thereto so that the convection heat thereby created goes downwardly toward the conveyor and in a generally circular path under the heating element and up again to the other baffle and over the element.

4. A baking oven for baking cookies or the like by the use of heat applied to the goods by radiation and convection comprising; a baking chamber, a conveyor traveling from end to end of the chamber for supporting cookies or the like that are to be baked, a ceiling for the chamber comprising adjacent pairs of baffles spaced along the length of the chamber, the baffles in each pair sloping downwardly and away from each other so that heat radiated from the baffles is directed toward the conveyor, and a transversely extending gas burner associated with each pair of baffles and positioned beneath the peak of each pair of baffles and spaced therefrom and above the conveyor, each burner having means for directing flames upwardly towards the baffle of each pair nearer the exit and at an acute angle thereto so that the heated air currents thereby created travel in a generally circular path under the burner toward the conveyor and up again to the other baffle and over the element.

5. A baking oven comprising, in combination, a baking chamber formed as a generally horizontal tunnel, a conveyor passing longitudinally through said tunnel, a series of gas burners extending transversely of and within said tunnel above said conveyor, and baffle means arranged to direct heat radiated therefrom toward the conveyor including a pair of baffles associated with each burner, the baffles in each pair sloping downwardly and away from each other, said gas burners having outlet holes directed upwardly at an acute angle to one baffle of each pair to cause heated air currents to flow in a circular path around the burners and toward the conveyor.

References Cited in the file of this patent
UNITED STATES PATENTS

| | | |
|---|---|---|
| 2,052,067 | Zeimet | Aug. 25, 1936 |
| 2,483,681 | Neut | Oct. 4, 1949 |
| 2,535,650 | Neutelings et al. | Dec. 26, 1950 |
| 2,709,412 | Eagerman | May 31, 1955 |